United States Patent
Jeon et al.

(10) Patent No.: US 10,490,184 B2
(45) Date of Patent: Nov. 26, 2019

(54) VOICE RECOGNITION APPARATUS AND METHOD

(71) Applicant: SAMSUNG ELECTRONICS CO., LTD., Suwon-si (KR)

(72) Inventors: Jehun Jeon, Suwon-si (KR); Jung-Hoe Kim, Seongnam-si (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 116 days.

(21) Appl. No.: 15/625,861

(22) Filed: Jun. 16, 2017

(65) Prior Publication Data

US 2018/0130463 A1 May 10, 2018

(30) Foreign Application Priority Data

Nov. 10, 2016 (KR) .................. 10-2016-0149552

(51) Int. Cl.
| | |
|---|---|
| *G10L 15/18* | (2013.01) |
| *G10L 15/02* | (2006.01) |
| *G10L 15/06* | (2013.01) |
| *G10L 15/14* | (2006.01) |
| *G10L 15/22* | (2006.01) |
| *G06F 17/27* | (2006.01) |
| *G06F 16/35* | (2019.01) |
| *G06F 16/332* | (2019.01) |
| *G10L 15/16* | (2006.01) |

(52) U.S. Cl.
CPC ...... *G10L 15/1815* (2013.01); *G06F 16/3329* (2019.01); *G06F 16/353* (2019.01); *G06F 17/27* (2013.01); *G06F 17/279* (2013.01); *G06F 17/2785* (2013.01); *G10L 15/02* (2013.01); *G10L 15/063* (2013.01); *G10L 15/14* (2013.01); *G10L 15/22* (2013.01); *G10L 15/16* (2013.01); *G10L 15/18* (2013.01); *G10L 2015/223* (2013.01)

(58) Field of Classification Search
CPC .................. G10L 15/16; G10L 15/18
See application file for complete search history.

(56) References Cited

U.S. PATENT DOCUMENTS

| | | | |
|---|---|---|---|
| 8,676,565 B2 | 3/2014 | Larcheveque et al. | |
| 8,738,379 B2 | 5/2014 | Tur | |
| 9,705,832 B2* | 7/2017 | Waltermann | H04L 51/16 |
| 2007/0208556 A1* | 9/2007 | Kwak | G06F 17/2705 704/9 |
| 2010/0094844 A1* | 4/2010 | Cras | G06F 17/2785 707/705 |

(Continued)

FOREIGN PATENT DOCUMENTS

| | | |
|---|---|---|
| JP | 2005-149329 A | 6/2005 |
| JP | 3949356 B2 | 7/2007 |

(Continued)

*Primary Examiner* — Feng-Tzer Tzeng
(74) *Attorney, Agent, or Firm* — Cha & Reiter, LLC

(57) ABSTRACT

An intention analysis apparatus includes an extractor configured to extract a feature value from a text input corresponding to machine recognition of an audio signal, a verifier configured to verify at least one state value associated with at least one of the text input or the audio signal, and a trained calculator configured to calculate a probability distribution of a user intention corresponding to the audio signal based on the feature value and the at least one state value.

17 Claims, 6 Drawing Sheets

(56) References Cited

U.S. PATENT DOCUMENTS

| | | | |
|---|---|---|---|
| 2012/0253788 A1 | 10/2012 | Heck et al. | |
| 2015/0039299 A1* | 2/2015 | Weinstein | G10L 15/16 704/202 |
| 2015/0066479 A1 | 3/2015 | Pasupalak et al. | |
| 2015/0255064 A1* | 9/2015 | Fujii | G06F 17/2755 704/257 |

FOREIGN PATENT DOCUMENTS

| | | |
|---|---|---|
| JP | 2010-224194 A | 10/2010 |
| JP | 2015-230384 A | 12/2015 |
| KR | 10-2005-0037791 A | 4/2005 |
| KR | 10-2009-0000442 A | 1/2009 |
| KR | 10-2013-0128717 A | 11/2013 |
| KR | 10-1565143 B1 | 11/2015 |
| KR | 10-1624184 B1 | 6/2016 |

\* cited by examiner

VOICE RECOGNITION APPARATUS AND METHOD

CROSS-REFERENCE TO RELATED APPLICATION

This application claims the benefit under 35 USC § 119(a) of Korean Patent Application No. 10-2016-0149552, filed on Nov. 10, 2016, in the Korean Intellectual Property Office, the entire disclosure of which is incorporated herein by reference for all purposes.

BACKGROUND

1. Field

The following description relates to a voice recognition technology based on an intention analysis.

2. Description of Related Art

Currently, voice recognition apparatus is being widely used. The voice recognition apparatus controls an electronic device using an audio signal based on a user environment, for example, to perform cleaning using an interactive robot cleaner, to confirm a location using a smartphone, to set a destination or change a path using a navigation system. User's audio signals as well as text-based typing inputs according to a related art are used as input signals. Also, a communication with a user is enabled by a conversational agent supported by an electronic device.

For example, an electronic device receives an audio signal from a user, analyzes an intention of the user based on text recognized based on an acoustic model from the received audio signal, and executes a task corresponding to the analyzed intention.

SUMMARY

This Summary is provided to introduce a selection of concepts in a simplified form that are further described below in the Detailed Description. This Summary is not intended to identify key features or essential features of the claimed subject matter, nor is the Summary intended to be used as an aid in determining the scope of the claimed subject matter.

In one general aspect, an intention analysis apparatus includes an extractor configured to extract a feature value from a text input corresponding to a machine recognition of an audio signal, a verifier configured to verify at least one state value associated with the text input, and a trained calculator configured to calculate a probability distribution of a user intention corresponding to the audio signal based on the feature value and the at least one state value.

The verifier may be further configured to verify, as the state value, at least one of an identifier or a state of an application program that is being executed in association with at least one of the text input or the audio signal.

The verifier may be further configured to verify, as the state value, at least one of an identifier or a state of an electronic device that executes an application program associated with at least one of the text input or the audio signal.

The verifier may be further configured to verify a state value defined by a plurality of commands of an application program that is being executed in association with at least one of the text input or the audio signal. The verifier may be further configured to verify a state value defined by a plurality of domains in which the plurality of commands are executed by the application program.

The verifier may be further configured to verify a state value defined based on a first command that is a last command executed by an application program before the audio signal is acquired, and the application program is being executed in association with at least one of the text input or the audio signal.

The calculator is configured as having been trained by using, as training data, virtual conversational states obtained by classifying a plurality of pieces of training utterance data based on intentions overlapping between the plurality of pieces of training utterance data, and actual conversational states obtained by classifying the plurality of pieces of training utterance data based on a specific intention included in each of the plurality of pieces of training utterance data.

The intention analysis apparatus may further include a memory and a processor that is configured to include one or more of the extractor, the verifier, and the calculator, and the processor may be further configured to train at least the calculator by using, as training data, virtual conversational states obtained by classifying a plurality of pieces of training utterance data based on intentions overlapping between the plurality of pieces of training utterance data, and actual conversational states obtained by classifying the plurality of pieces of training utterance data based on a specific intention included in each of the plurality of pieces of training utterance data, and to store parameters of the trained calculator in the memory. The feature value and the at least one state value may be input to the calculator to calculate the probability distribution of the user intention.

The processor may include a first determiner configured to determine the virtual conversational states based on the intentions overlapping between the plurality of pieces of training utterance data, and a second determiner configured to determine the actual conversational states associated with the plurality of pieces of training utterance data.

The intention analysis apparatus may further include a processor that is configured to include one or more of the extractor, the verifier, and the calculator, and the processor may be further configured to perform the machine recognition of the audio signal.

The verifier may be further configured to verify, as the state value, history information of a plurality of commands executed by a user.

In one general aspect, an intention analysis apparatus includes a processor configured to determine respective virtual conversational states based on intentions overlapping between a plurality of pieces of training utterance data, and determine respective actual conversational states associated with the plurality of pieces of training utterance data.

The processor may be further configured to extract a feature value from an audio signal, verify a state value, and input the feature value and the state value to a trained intention model and calculate a probability distribution of a user intention for the audio signal as an output result of the trained intention model.

To determine the respective virtual conversational states, the processor may be configured to match each of the plurality of pieces of training utterance data to one of a plurality of predefined virtual conversational states based on at least one of an executed command or a corresponding domain associated with each of the plurality of pieces of training utterance data.

The intention analysis apparatus is trained by machine learning that uses a plurality of pieces of utterance data as input data and that uses the virtual conversational state and the actual conversational state as output data.

The processor may be further configured to determine, as a sampling rate, a number of the plurality of pieces of training utterance data to use in a learning of the respective actual conversational states based on the respective virtual conversational states associated with the plurality of pieces of training utterance data.

In one general aspect, an electronic device for providing a conversational agent to a user includes a sensor configured to, for an utterance of the user, acquire an audio signal corresponding to the utterance, a processor configured to extract a feature value associated with a text input corresponding to a machine recognition of the audio signal by applying a machine learning result to the text input, to verify at least one state value associated with an application program executed by the electronic device, and to calculate a probability distribution of a user intention corresponding to the utterance based on the feature value and the at least one state value, and a display configured to display an execution result of a task corresponding to the user intention to the user determined according to the calculated probability distribution.

The processor may be further configured to verify, as the state value, at least one of an identifier or a state of an application program that is being executed by the electronic device in association with at least one of the text input or the audio signal.

The processor may be further configured to verify, as the state value, at least one of an identifier or a state of the electronic device that executes an application program associated with at least one of the text input or the audio signal.

The processor may be further configured to verify a state value defined based on a first command that is a last command executed by an application program before the audio signal is acquired, and the application program is being executed in association with at least one of the text input or the audio signal.

In one general aspect, a processor implemented intention analysis method includes extracting a feature value from a text input corresponding to a machine recognition of an audio signal, verifying at least one state value associated with at least one of the text input or the audio signal, calculating a probability distribution of a user intention corresponding to the audio signal based on an applying of a trained intention model to the feature value and the at least one state value, and controlling an implementing of a processor implemented task corresponding to the user intention based on the calculated probability distribution.

The trained intention model may be an intention model trained by machine learning that uses a plurality of pieces of training utterance data as input data and that uses a determined virtual conversational state, based on intentions overlapping between the plurality of pieces of training utterance data, and an actual conversational state associated with the plurality of pieces of training utterance data as output data.

The method may further include performing the machine recognition of the audio signal to generate the text input.

Other features and aspects will be apparent from the following detailed description, the drawings, and the claims.

Figure 1:
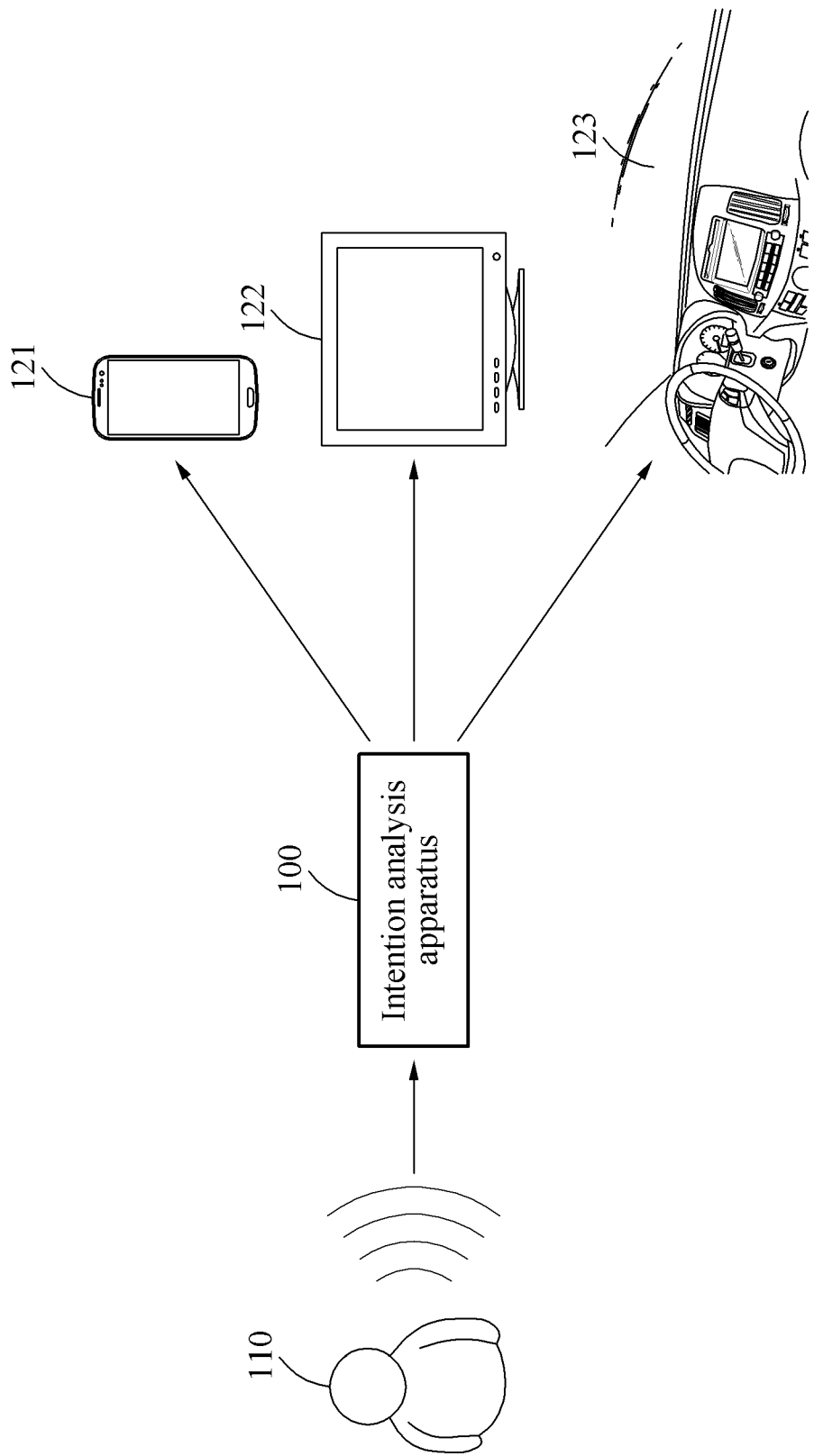
FIG. 1 illustrates an example operation of an intention analysis apparatus in accordance with one or more embodiments.

Throughout the drawings and the detailed description, unless otherwise described or provided, the same drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. Accordingly, as the following structural or functional descriptions are provided to merely describe or explain non-limiting examples, the scope of the respective examples are not limited to the descriptions provided in the present specification.

Although terms of "first" or "second" may be used to explain various components, the components are not limited to the terms. These terms should be used only to distinguish one component from another component, unless expressly explained otherwise. For example, a "first" component may be referred to as a "second" component, or similarly, and the "second" component may be referred to as the "first" component within the scope of the right according to the concept of the present disclosure.

When it is mentioned that one component is "connected" or "accessed" to another component, it may be understood that the one component is directly connected or accessed to another component or that still another component is interposed between the two components.

As used herein, the singular forms "a", "an", and "the" are intended to include the plural forms as well, unless the context clearly indicates otherwise. It will be further understood that the terms "include/comprise" and/or "have" when used in the Specification, specify the presence of stated features, integers, operations, elements, components or a combination thereof in at least one embodiment, such as when it is indicated that such stated features, integers, operations, elements, components or a combination thereof may be included in an example. However, the use of include/comprise" and/or "have" in the Specification do not preclude the presence or addition of one or more other features, integers, operations, elements, components, and/or groups thereof in other embodiments, and do not preclude in the Specification the lack of presence of any of such features, integers, operations, elements, components, and/or groups thereof in still other embodiments unless explicitly or contextually/implicitly clearly explained otherwise.

Unless otherwise defined herein, all terms used herein including technical or scientific terms have the same meanings as those generally understood by one of ordinary skill in the art to which this disclosure pertains consistent with and after an understanding of the present disclosure. Terms defined in dictionaries generally used should be construed to have meanings matching with contextual meanings in the related art and the present disclosure and are not to be construed as an ideal or excessively formal meaning unless otherwise defined herein.

In the following description, a state associated with an utterance should be understood to mean a temporal or spatial condition regarding an utterance of a user. For example, a state value includes a type of electronic device(s), of predetermined different types of electronic devices, to which an utterance of a user is input, a type of application program(s), of predetermined different types of application programs, executed by the utterance, or a type of task(s), of predetermined different types of tasks, executed before the utterance is performed. Here, these descriptions of example state values are merely examples for convenience to facilitate understanding, and should not be construed as limiting other examples.

In addition, in the following description, a feature should be understood to mean a condition to execute a task associated with a user intention.

FIG. 1 illustrates an example operation of an intention analysis apparatus in accordance with one or more embodiments. Referring to FIG. 1, an intention analysis apparatus 100 receives or captures an input audio signal from a user 110 or receives a text input generated by processing the audio signal, and controls various electronic devices, for example, electronic devices 121, 122 and 123, to execute tasks corresponding to at least one of the received text input or the input audio signal. The various electronic devices may provide, either individually or collectively, a processor implemented conversational agent. For example, an intention analysis apparatus may be implemented by a computer or computing machine that includes at least one processor, and an intention analysis of which is at least temporarily implemented by the at least one processor. The text input is, for example, recognition data obtained from a machine recognition operation of the audio signal. For example, the text input may be a recognition output of linguistic model-based voice recognition system, e.g., an acoustic model-based voice recognition system, included in the intention analysis apparatus 100. The intention analysis apparatus 100 is configured to calculate a probability distribution corresponding to a user intention that can be derived from such recognition output or from the input audio signal, and is implemented as, for example, a voice recognition apparatus.

In the above description, and in varying corresponding embodiments, such a voice recognition apparatus may be any of varying types of apparatuses capable of processing an audio signal of a user. There are various types of voice recognition apparatus embodiments, for example, a mobile device type, a wearable device type, or a stationary device type. As further examples, the varying types include, for example, a smartphone type, a smart television (TV) type, a smart watch type, a smart washing machine type, a smart camera type, a smart audio system type, a smart bicycle type, smart glasses type, a remote controller type, a smart refrigerator type, a smart air conditioner type, a laptop type, a personal digital assistant (PDA) type, or a tablet type. In addition, such voice recognition apparatus embodiments include communication hardware, and accordingly voice recognition apparatuses may be connected to each other via a communication network, where such respective communication hardware communicate according to various communication protocols, to share information between the voice recognition apparatuses.

The intention analysis apparatus 100 may receive a text input generated as results of a linguistic model-based voice recognition scheme, such as an acoustic model-based voice recognition scheme that applies an acoustic model, applied to an audio signal input from a user. The intention analysis apparatus 100 may then extract a feature value corresponding to the text input. For example, the intention analysis apparatus 100 may verify, as a state value, at least one of the electronic devices 121 through 123 associated with at least one of the received text input or the input audio signal or corresponding application programs respectively executed by such electronic devices 121 through 123.

The intention analysis apparatus 100 may analyze for intentions of the received text input or the input audio signal for implementation of various application programs in various devices, e.g., instead of analyzing for an intention of the received text input or the input audio signal for a predetermined device or a predetermined application program as a target. In an example, the intention analysis apparatus 100 may analyze for a user intention of the received text input or the input audio signal for an application program that may be provided, e.g., only, distinctly, or generally, by the electronic device 121 (for example, a smartphone) and various functions corresponding to the application program that may be provided by the electronic device 121. In another example, the intention analysis apparatus 100 may analyzes for a user intention of the received text input or the input audio signal for an application program that may be provided, e.g., only, distinctly, or generally, by the electronic device 122 (for example, a smart TV) or that may be provided, e.g., only, distinctly, or generally, by the electronic device 123 (for example, a navigation device for use in a vehicle), and various respective functions corresponding to such application programs.

A process of analyzing a user intention corresponding to a state value and various application programs by the intention analysis apparatus 100, and a process of performing machine learning to implement intention analyses, e.g., by the intention analysis apparatus 100, will be further described below.

Figure 2:
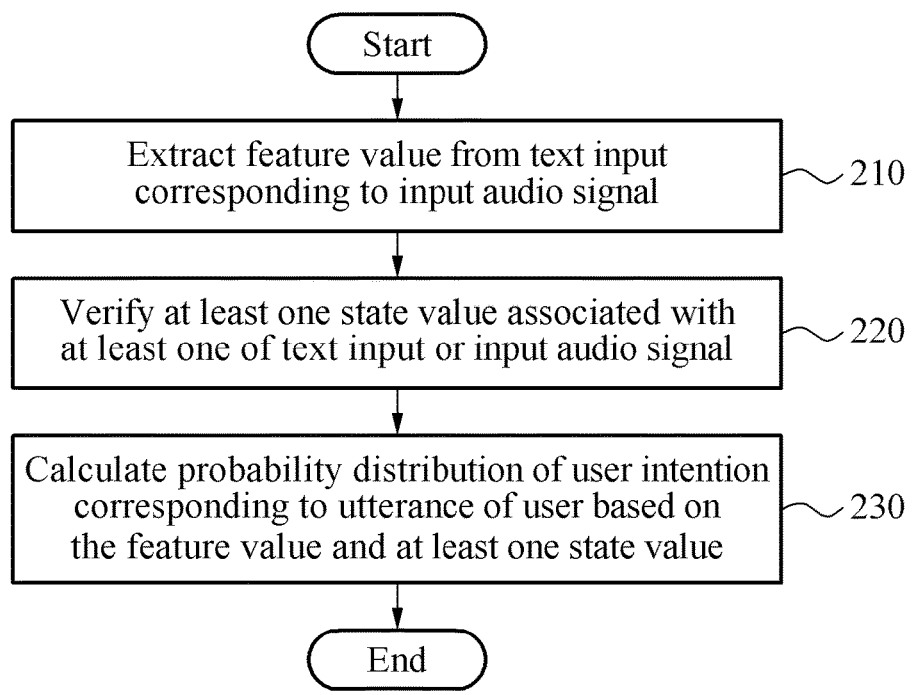
FIG. 2 is a flowchart illustrating an example intention analysis method in accordance with one or more embodiments.

FIG. 2 illustrates an example intention analysis method in accordance with one or more embodiments. Below, merely for convenience of explanation, operations of the intention analysis method will be described through explanation of an operation of an intention analysis apparatus, such as any of the intention analysis apparatuses discussed herein, noting that embodiments are not limited thereto.

Referring to FIG. 2, in operation 210, the intention analysis apparatus extracts a feature value from a text input that is or has been generated by applying a linguistic model-based voice recognition scheme, e.g., an acoustic model-based voice recognition scheme, to an input audio signal. For example, the intention analysis apparatus acquires, i.e., receives or captures, an audio signal input representing an utterance of a user. In an example, the intention analysis apparatus performs the recognition of the input audio signal by using the linguistic model and generates the text input, as result data, as the recognition result of the performed recognition. For example, the intention analysis apparatus extracts a feature value for performing a task by applying pre-trained result data to the text input corresponding to the audio signal. For example, when an audio signal corresponding to "What's the weather like tomorrow?" is input, the intention analysis apparatus may extract a first feature value corresponding to "tomorrow" and a second feature value corresponding to "weather." Thus, as explained below, the intention analysis apparatus may analyze a user intention using such pre-trained result data based on at least one state value as well as the feature value, and may provide a user with an integrated conversational agent that is applicable specifically or generally to various devices based on the user intention analysis.

In operation 220, the intention analysis apparatus verifies at least one state value associated with at least one of the text input or the input audio signal, e.g., associated with a received text input, text input generated from the input audio signal, raw or preprocessed audio data of the input audio signal, other determined characteristics or information regarding the input audio signal, or any combination of the same, as only examples. In an example, the state value is defined by a plurality of commands executable by an application program that is being executed in association with at least one of the text input or the input audio signal. In another example, the state value is defined as at least one of an identifier or a state of an application program that is being executed in association with at least one of the text input or the input audio signal.

In still another example, the state value is defined as history information of a plurality of commands executed by a user. When history information indicating that a user sequentially requests a first command and a second command within a predetermined time slot exists, the intention analysis apparatus verifies the history information as the state value. For example, when history information indicating that a user requests a first command to turn off an alarm at 7 a.m. and requests a second command to execute a music program exists, the intention analysis apparatus verifies the history information as the state value.

In operation 230, the intention analysis apparatus calculates a probability distribution of a user intention corresponding to the utterance of the user based on the feature value and the at least one state value. For example, the intention analysis apparatus applies the feature value and the at least one state value to the pre-trained result data and calculates the probability distribution of the user intention for the utterance.

For example, the intention analysis apparatus acquires an audio signal corresponding to "What's the weather like tomorrow?" from a user, and a first feature value corresponding to "tomorrow" and a second feature value corresponding to "weather" are identified. In this example, the intention analysis apparatus verifies a state value corresponding to an electronic device used to execute an application program in operation 220. When an electronic device to which the audio signal is input is a smart refrigerator that does not provide a function of checking the weather, the intention analysis apparatus calculates a probability distribution of a user intention based on a feature value and a state value, and outputs "out of command" indicating that a command is not executable. The above-described example is merely an example and should not be construed as limiting other examples.

Figure 3A:
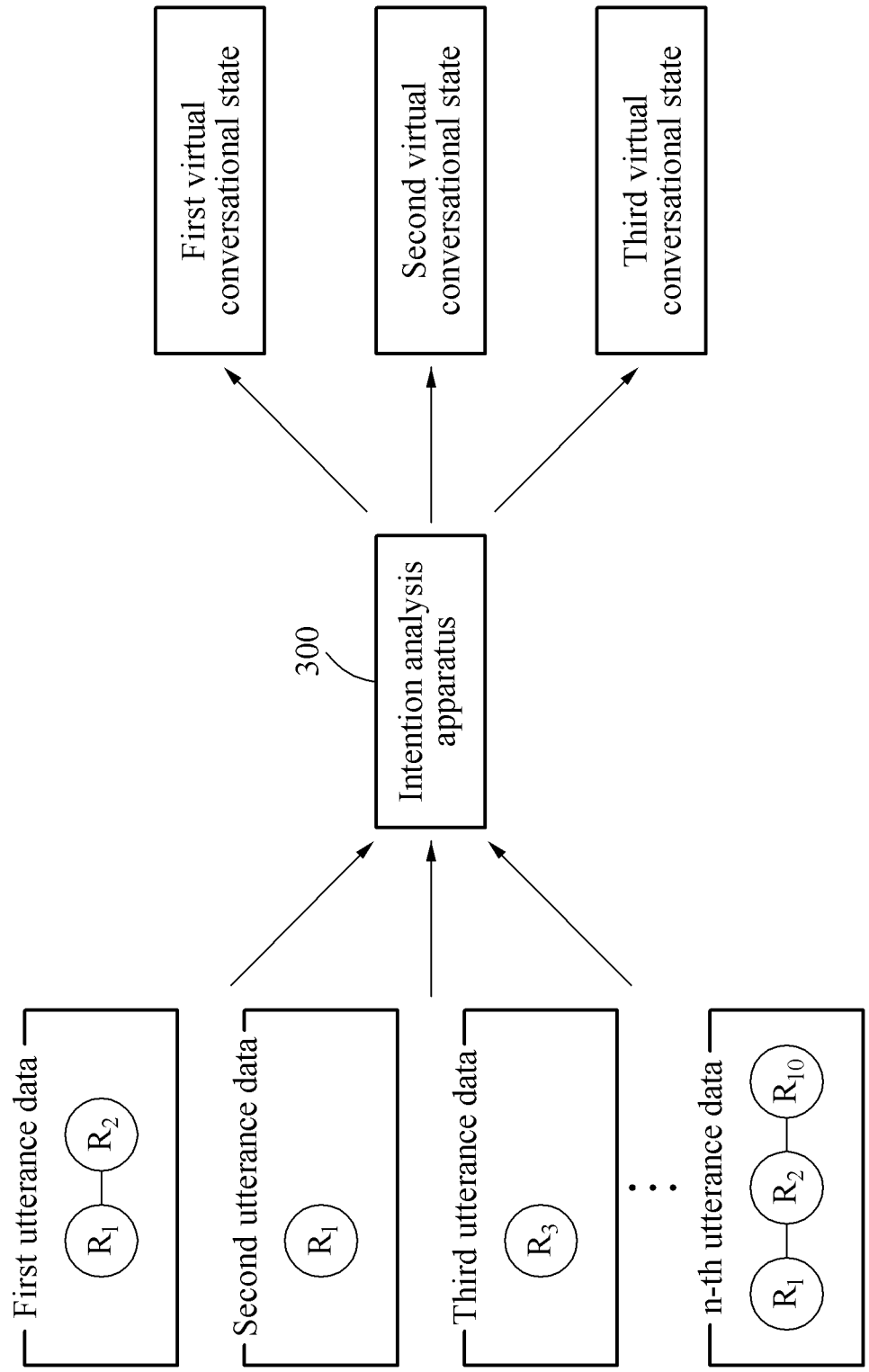
FIG. 3A illustrates an example process of determining a virtual conversational state of a plurality of pieces of utterance data in accordance with one or more embodiments.

FIG. 3A illustrates an example process of determining a virtual conversational state of a plurality of pieces of utterance data in accordance with one or more embodiments. Below, merely for convenience of explanation, processes of determining a virtual conversational state of a plurality of pieces of utterance data will be described through explanation of an operation of an intention analysis apparatus 300, noting that such processes may also be implemented by any other intention analysis apparatus discussed herein and noting that embodiments are also not limited thereto.

FIG. 3A illustrates a process by which the intention analysis apparatus 300 matches each of a plurality of pieces of utterance data to one of plural virtual conversational states, in a machine learning operation. In the following description, utterance data may be data associated with an utterance of a user, for example, and may include, for example, audio data or text data derived by performing voice recognition of the audio data. In an example, the plurality of pieces of utterance data may be training data.

The intention analysis apparatus 300 performs processor implemented machine learning based on the plurality of pieces of utterance data, and generates a specialized integrated intention analysis model as pre-trained result data. The specialized integrated analysis model, as the pre-trained result data, may be stored in a memory of the intention analysis apparatus 300. The specialized integrated analysis model may also be provided and/or updated between electronic devices or intention analysis apparatuses, or from an external or remote server, for example The plurality of pieces of utterance data include an actual conversational state associated with an intention analysis. In the following description, the actual conversational state is a known or determined temporal or spatial condition including a known or determined environment in which an utterance of a user occurs.

In generating the integrated intention analysis model, the intention analysis apparatus 300 uses first utterance data through n-th utterance data as raw data, for example. In this example, n is a natural number equal to or greater than "1" and denotes a range or a number of pieces of utterance data which may vary depending on embodiment and/or user/manufacturer enabled selection.

For example, the first utterance data includes R1 and R2 as actual conversational states. Similarly, second utterance data includes R1 as an actual conversational state, and third utterance data includes R3 as an actual conversational state. Also, the n-th utterance data includes R1, R2 and R10 as actual conversational states.

The intention analysis apparatus 300 determines a virtual conversational state based on overlapping of user intentions between the plurality of pieces of utterance data. For example, the intention analysis apparatus 300 matches the plurality of pieces of utterance data to one of a plurality of predefined virtual conversational states based on independent user intentions that are distinguishable from each other.

The illustrated intention analysis apparatus 300 may be representative of a first determiner and a second determiner, for example. In such an example, the first determiner determines a virtual conversational state associated with each of the plurality of pieces of utterance data based on user intentions overlapping between the plurality of pieces of utterance data. The first determiner may be used to machine learn an intention analysis model with respect to virtual conversational states, for example. The second determiner determines an actual conversational state associated with the plurality of pieces of utterance data. The second determiner may be used to machine learn an intention analysis model with respect to the actual conversational states. In an example, trained results of the machine learning of the intention analysis model with respect to virtual conversational states and the machine learning of the intention analysis model with respect to the actual conversational states may be stored in a memory of the intention analysis apparatus 300. The first determiner matches each of the plurality of pieces of utterance data to one of a plurality of predefined virtual conversational states based on at least one of an instruction associated with each of the plurality of pieces of utterance data or a domain in which the instruction is executed. In such an example the intention analysis apparatus 300 may further be representative of a sampler configured to determine, as a sampling rate, a number of the plurality of pieces of utterance data that are used in the machine learning to learn an actual conversational state based on a virtual conversational state associated with each of the plurality of pieces of utterance data.

As illustrated in FIG. 3, all the first utterance data, the second utterance data, and the n-th utterance data include the actual conversational state R1 that may allow the first utterance data, the second utterance data, and the n-th utterance data to be distinguished independently from the third utterance data. Also, the third utterance data includes the actual conversational state R3 that may allow the third utterance data to be distinguished independently from the first utterance data, the second utterance data, and the n-th utterance data. The intention analysis apparatus 300 may determine the first utterance data, the second utterance data, and the n-th utterance data to correspond to a first virtual conversational state, based on a first intention determined to be associated with the actual conversational state R1, and determines the third utterance data to correspond to a second virtual conversational state based on a second intention determined to be associated with the actual conversational state R3.

Figure 3B:
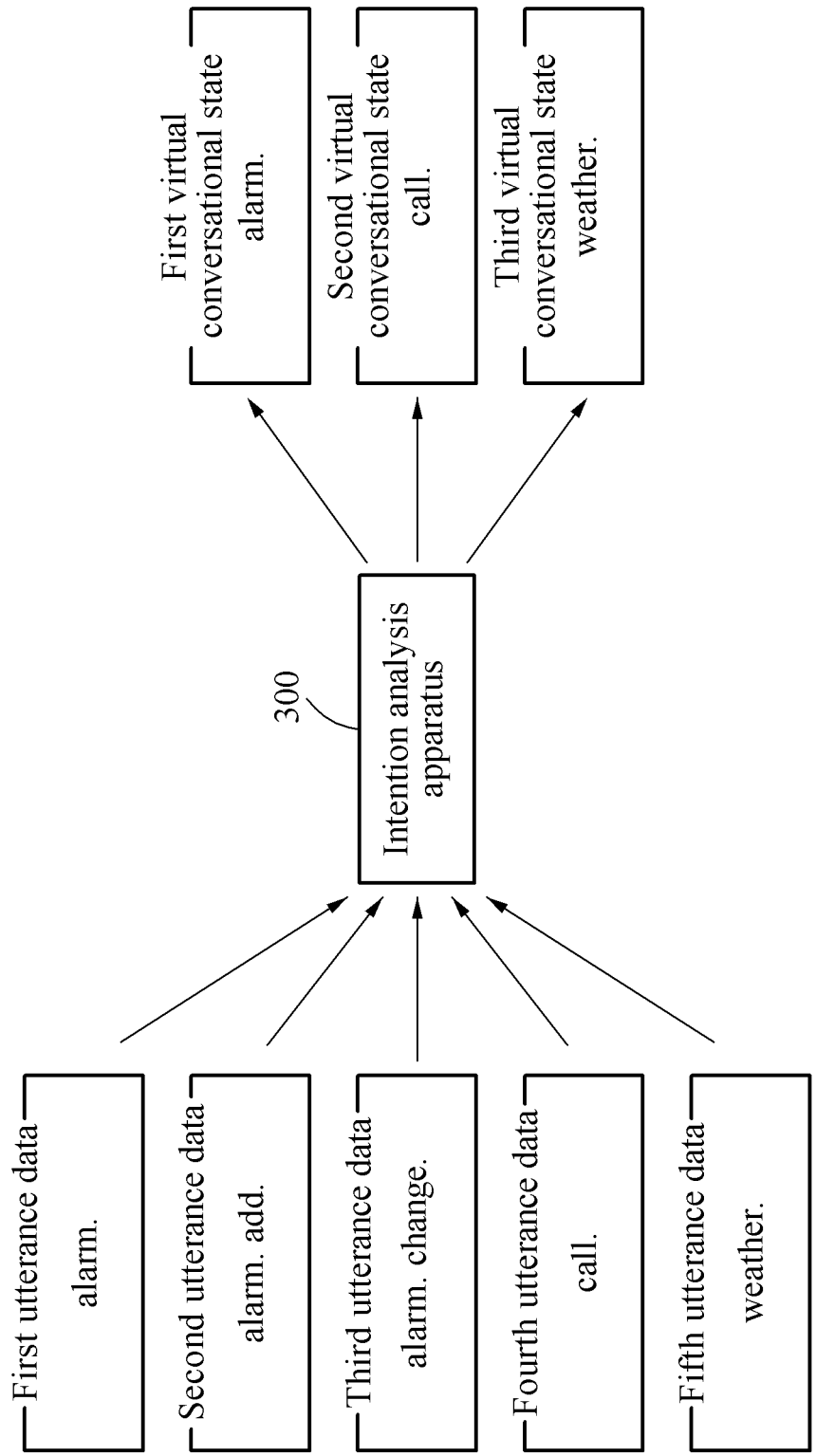
FIG. 3B illustrates an example process of determining a virtual conversational state of a plurality of pieces of utterance data in accordance with one or more embodiments.

FIG. 3B illustrates an example process of determining a virtual conversational state of a plurality of pieces of utterance data in accordance with one or more embodiments. Below, merely for convenience of explanation, processes of determining a virtual conversational state of a plurality of pieces of utterance data will again be described through explanation of an operation of the intention analysis apparatus 300, noting that such processes may also be implemented by any other intention analysis apparatus discussed herein and noting that embodiments are also not limited thereto.

FIG. 3B illustrates an example of a process by which the intention analysis apparatus 300 matches each of a plurality of pieces of utterance data to one of plural virtual conversational states, to perform machine learning.

FIG. 3B illustrates examples of actual conversational states associated with each utterance data. First utterance data includes an actual conversational state corresponding to a command "alarm.", for example, "Set an alarm." Second utterance data includes an actual conversational state corresponding to a command "alarm. add.", for example, "Add an alarm time." Also, third utterance data includes an actual conversational state corresponding to a command "alarm. change.", for example, "Change the alarm time." In addition, fourth utterance data includes an actual conversational state corresponding to a command "call.", for example, "Place a call." and fifth utterance data includes an actual conversational state corresponding to a command "weather", for example, "How is the weather?."

The intention analysis apparatus 300 classifies independently distinguishable intentions among user intentions associated with the plurality of pieces of utterance data into different virtual conversational states. For example, the intention analysis apparatus 300 classifies each of the plurality of pieces of utterance data as one of a plurality of virtual conversational states based on at least one of a determined instruction associated with a user intention or a determined domain in which the instruction is executed.

Referring to FIG. 3B, all the first utterance data, the second utterance data, and the third utterance data includes an intention "alarm". The intention analysis apparatus 300 classifies the first utterance data, the second utterance data, and the third utterance data as a first virtual conversational state associated with "alarm" based on overlapping intentions. However, fourth utterance data is associated with an intention "call". The intention analysis apparatus 300 determine that the intentions "call" and "alarm" are independent of each other, based on a determined instruction associated with the fourth utterance data or a determined domain in which the instruction is executed. Thus, the intention analysis apparatus 300 classifies the fourth utterance data as a second virtual conversational state based on the above determination.

Similarly, fifth utterance data is associated with an intention "weather". The intention analysis apparatus 300 determines the intention "weather" is independent of the intentions "call" and "alarm", based on a determined instruction associated with the fifth utterance data or a determined domain in which the instruction is executed. Thus, the intention analysis apparatus 300 classifies the fifth utterance data as a third virtual conversational state based on the above determination.

The above description of the utterance data, the actual conversational states, and the intentions is merely an example and should not be construed as limiting other examples. For example, it is possible to achieve an extension to user intentions on various functions respectively supported by general, specific, or like electronic device(s) that include an interactive agent, for example, an intention "FindPOI" for finding a point of interest (POI) in response to an utterance of a user, for a mobile device type electronic device embodiment, or an intention "schedule", for any types of electronic device embodiments a user, or a particular user, may use for adjusting the user's schedule.

Figure 4:
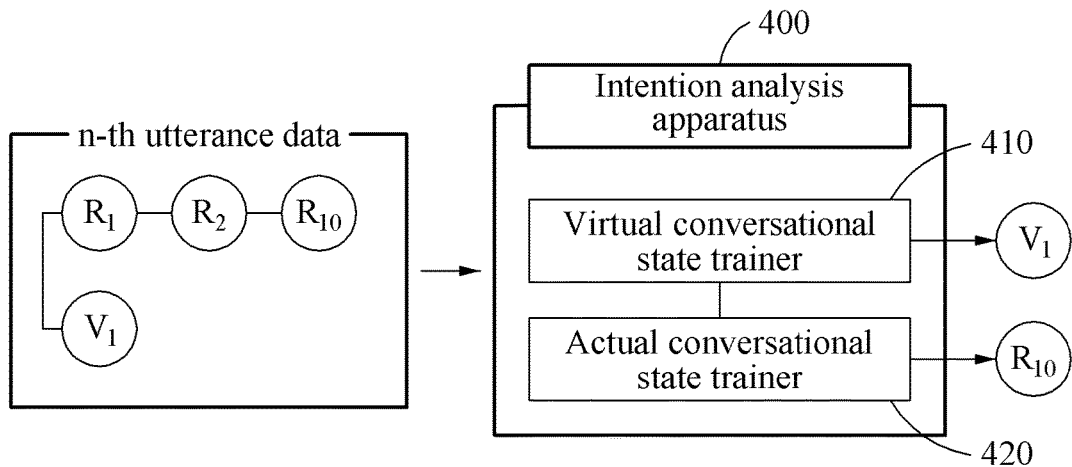
FIG. 4 illustrates an example machine learning process based on a plurality of pieces of utterance data in accordance with one or more embodiments.

FIG. 4 illustrates an example machine learning process based on a plurality of pieces of utterance data in accordance with one or more embodiments. Below, merely for convenience of explanation, machine learning processes based on a plurality of pieces of utterance data will be described through explanation of an operation of an intention analysis apparatus 400, noting that such processes may also be implemented by any other intention analysis apparatuses discussed herein and noting that embodiments are also not limited thereto.

Referring to FIG. 4, the intention analysis apparatus 400 performs machine learning based on a plurality of pieces of utterance data, such as the respective example differing utterance data discussed above with respect to FIGS. 3A and/or 3B, as only examples. The intention analysis apparatus 400 includes a processor implemented virtual conversational state trainer 410 and a processor implemented actual conversational state trainer 420. The intention analysis apparatus 400 uses the plurality of pieces of utterance data as input data, and uses a virtual conversational state and an actual conversational state as output data, to perform machine learning. For example, each of the plurality of pieces of utterance data includes at least a pair of a virtual conversational state and an actual conversational state that are matched to each of the plurality of pieces of utterance data. A process of determining a virtual conversational state based on a user intention associated with each of a plurality of pieces of utterance data has been described above with reference to FIGS. 3A and 3B, and accordingly a detailed explanation of the training operations of the virtual conversational state trainer 410 are not repeated here.

In the training of the actual conversational state trainer 420, for example, n-th utterance data among the plurality of pieces of utterance data is input to the intention analysis apparatus 400. The n-th utterance data is determined by intention analysis apparatus 400 to be associated with a first actual conversational state R1, a second actual conversational state R2, and a third actual conversational state R10. Also, in the training of the virtual conversational state trainer 410, the n-th utterance data is matched by the intention analysis apparatus 400 to a first virtual conversational state V1. In this example, the intention analysis apparatus 400 receives an input of the n-th utterance data and outputs a virtual conversational state and an actual conversational state respectively by the virtual conversational state trainer 410 and the actual conversational state trainer 420. Thus, the virtual conversational state trainer 410 performs matching learning to allow the first virtual conversational state V1 to be output from the n-th utterance data, and the actual conversational state trainer 420 performs matching learning to allow the third actual conversational state R10 to be output from the n-th utterance data.

In an example, "1,000" pieces of utterance data are used as training data, with ten actual conversational states and two virtual conversational states being supported by the intention analysis apparatus 400. The intention analysis apparatus 400 samples a plurality of pieces of utterance data stored in a virtual conversational state and uses the sampled utterance data to learn an actual conversational state. For example, a sampler included in the intention analysis apparatus 400 controls a number of a plurality of pieces of utterance data used to learn an actual conversational state based on a virtual conversational state. For example, when a sampling rate is determined as "1," "100" pieces of utterance data are used to learn each of ten actual conversational states. In an example, all "1,000" pieces of utterance data may be used for a training operation to extract a feature value trained as a virtual conversational state.

The intention analysis apparatus 400 may adjust the sampling rate, to expect an effect of saving resources and time consumed for a corresponding training time operation by adjusting a quantity of training data in association with detailed "upper" intentions. Also, the intention analysis apparatus 400 may quickly and accurately implement training based on virtual conversational states obtained by broadly classifying utterance data in a "lower" intention analysis for overlapping intentions.

The intention analysis apparatus 400 is trained on overlapping intentions between the plurality of pieces of utterance data as a virtual conversational state, and is trained on information about a specific intention associated with each of the plurality of pieces of utterance data as an actual conversational state. In response to an input of utterance data, the intention analysis apparatus 400, implemented based on the above training scheme, may extract a feature value associated with overlapping intentions by applying training result data, and may more accurately calculate a probability distribution of a user intention by applying a state value associated with a specific intention.

Figure 5:
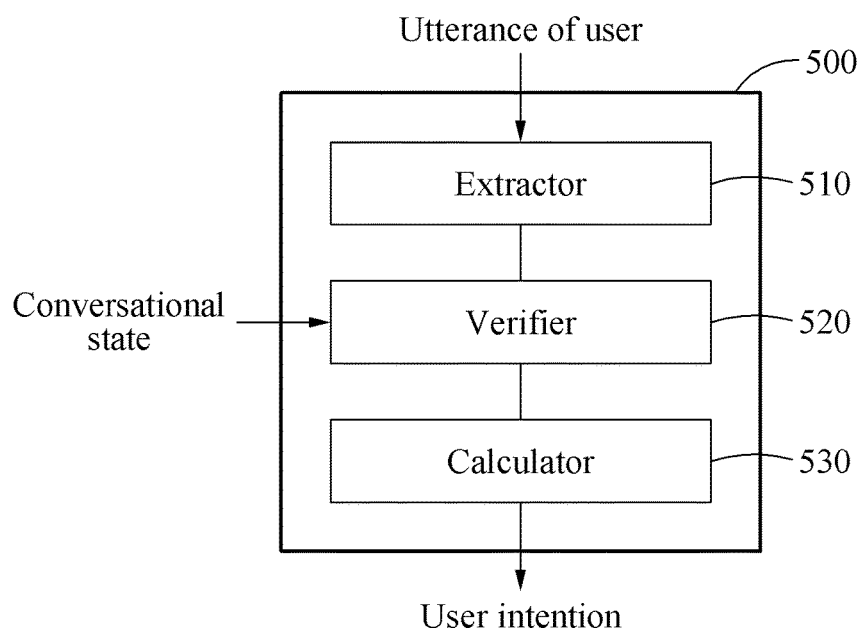
FIG. 5 is a block diagram illustrating an example intention analysis apparatus in accordance with one or more embodiments.

FIG. 5 illustrates an example intention analysis apparatus in accordance with one or more embodiments.

Referring to FIG. 5, an intention analysis apparatus 500 includes an extractor 510, a verifier 520, and a calculator 530, for example. The extractor 510, verifier 520, and calculator 530 may collectively be representative of one or more processors, or each or two or more of the extractor 510, verifier 520, and calculator 530 may be representative of different processors. The extractor 510 extracts a feature value from a text input generated by applying a linguistic model-based voice recognition scheme, e.g., an acoustic model-based voice recognition scheme, to an input audio signal. A processor of the intention analysis apparatus 500 may be configured to perform recognition of received or captured audio data to generate the text input. In an example, the extractor 510 extracts the feature value by applying pre-trained result data to at least one of the text input or the input audio signal. For example, the result data may be stored in a memory included in the intention analysis apparatus 500. The result data may be result data obtained by performing machine learning based on a plurality of pieces of utterance data paired with a virtual conversational state and an actual conversational state as described above, and may be performed by the intention analysis apparatus 500 or received or obtained from another apparatus or server. For example, the above descriptions of FIGS. 3A through 4 are also applicable to the training process that may be implemented by the intention analysis apparatus 500, and accordingly descriptions thereof are not repeated here.

The verifier 520 verifies at least one state value associated with at least one of the text input or the input audio signal. In an example, the verifier 520 verifies, as the state value, at least one of an identifier or a state of an application program that is being or would be executed in association with at least one of the text input or the input audio signal. The state of the application program may be, for example, an instruction that is being executed by the application program. In another example, the verifier 520 verifies, as the state value, at least one of an identifier or a state of an electronic device that executes an application program determined to be associated with at least one of the text input or the input audio signal. The state value may be defined by at least one of a plurality of commands executable by a determined application program that is being, or determined to be, executed in association with at least one of the text input or the input audio signal, or a plurality of determined domains in which the plurality of commands are executed. In still another example, the verifier 520 verifies a state value defined based on a first command executed by an application program before the audio signal is input, e.g., an immediately previous command to when the audio signal is input, and the application program is being executed in association with at least one of the text input or the input audio signal.

The calculator 530 calculates a probability distribution for an actual user intention corresponding to an utterance of a user based on the feature value and the at least one state value. For example, the calculator 530 is trained based on virtual conversational states obtained by classifying a plurality of pieces of utterance data based on intentions overlapping between the plurality of pieces of utterance data, and actual conversational states obtained by classifying the plurality of pieces of utterance data based on a specific intention included in each of the plurality of pieces of utterance data. The intention analysis apparatus may perform the training of the calculator as discussed above, or the trained calculator may be provided. For example, the training of the calculator may be stored as trained parameters for the calculator, or such parameters may be externally provided. The calculator 530 may also consider the calculated probability distribution and indicate a determined user intention based on a highest calculated probability or confidence level.

Figure 6:
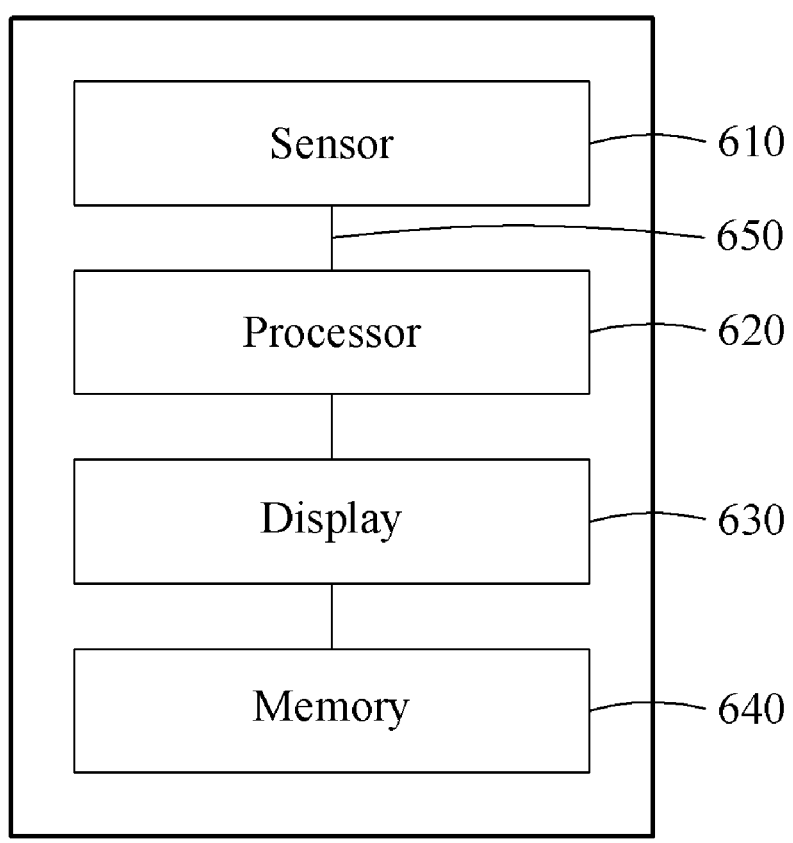
FIG. 6 is a block diagram illustrating an example electronic device providing a conversational agent to a user in accordance with one or more embodiments.

FIG. 6 illustrates an example electronic device providing a conversational agent to a user in accordance with one or more embodiments.

Referring to FIG. 6, an electronic device 600 includes a sensor 610, a processor 620 a display 630, a memory 640, and a bus 650 to facilitate data communication between the sensor 610, the processor 620, the display 630, and the memory 640, for example. The sensor 610 acquires an audio signal input in response to an utterance of a user. For example, the sensor 610 may be or include a microphone and acquire or capture an audio signal from a user. The memory 640 may store one or more linguistic models, such as an acoustic model and/or language model.

The processor 620 performs a model-based voice recognition on the input audio signal by identifying characteristics of the input audio signal and providing those identified characteristics to the acoustic model, for example, and based on results of the use of the example acoustic model with the identified characteristics representing most probable recognitions of the input audio signal, outputs a text input as result data of the voice recognition. Such an example acoustic model-based voice recognition and/or language-model based voiced scheme(s) are straightforward to one of ordinary skill in the art, and accordingly further description thereof is omitted here. Also, the processor 620 applies a machine learning result obtained in advance to the text input. For example, the machine learning result includes result data obtained by performing machine learning based on a plurality of pieces of utterance data paired with a virtual conversational state and an actual conversational state, as discussed above. In an example, the processor 620 is configured to perform the machine learning to generate, as the machine learning result, a specially trained intention model and may store the specially trained intention model in the memory 640. Alternatively, or in addition, the specialized trained intention model may obtained or updated from external sources, such as other electronic devices or an external or remote server. The processor 620 extracts a feature value associated with the text input based on the machine learning result. Also, the processor 620 verifies at least one state value associated with an application program executed by the electronic device 600. The processor 620 calculates a probability distribution of a user intention corresponding to the audio signal based on the feature value and the at least one state value.

The display 630 may display, to the user, an execution result of a task corresponding to the extracted feature value. For example, when an utterance of the user is associated with text input of "Set an alarm to 7:00.", the processor 620 extracts feature values "alarm", "7:00" and "set" associated with the utterance, and verifies a state of a scheduling program that is being executed for time settings as a state value. The processor 620 calculates a probability distribution of a user intention associated with "Set an alarm to 7:00." based on the feature values and the state value. The display 630 displays a screen in which an alarm is set to 7:00 to the user as a task corresponding to the input audio signal or the text input. However, there is no limitation to the above example. For example, the display 630 may display various task execution results, for example, a playback of a moving image stored in the electronic device 600 or a display of a schedule associated with a user.

The intention analysis apparatus 100, recognition apparatus, electronic device 121, electronic device 122, electronic device 123, intention analysis apparatus 300, intention analysis apparatus 400, virtual conversational state trainer 410, actual conversational state trainer 420, intention analysis apparatus 500, extractor 510, verifier 520, calculator 530, intention analysis apparatus 600, sensor 610, processor 620, display 630, memory 640, and bus 650, as only examples, of FIGS. 1-6 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-6 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An intention analysis apparatus, comprising:
    an extractor configured to extract a feature value from a text input corresponding to a machine recognition of an audio signal;
    a verifier configured to verify at least one state value associated with at least one of the text input or the audio signal; and
    a trained calculator configured to calculate a probability distribution of a user intention corresponding to the audio signal based on the feature value and the at least one state value,
    wherein the verifier is further configured to verify the state value by considering a first identifier of an application program and a first state of the application program that is being executed in association with at least one of the text input or the audio signal, and
    wherein the first state of the application program is a predetermined value corresponding to an instruction being executed by the application program.

2. The intention analysis apparatus of claim 1, wherein the verifier is further configured to verify the state value by further considering at least one of a second identifier of an electronic device or a second state of the electronic device that executes the application program associated with at least one of the text input or the audio signal.

3. The intention analysis apparatus of claim 1, wherein the verifier is further configured to verify the state value defined by a plurality of commands of the application program that is being executed in association with at least one of the text input or the audio signal.

4. The intention analysis apparatus of claim 3, wherein the verifier is further configured to verify a state value defined by a plurality of domains in which the plurality of commands are executed by the application program.

5. The intention analysis apparatus of claim 1, wherein the verifier is further configured to verify a state value defined based on a first command that is a last executed command by an application program before the audio signal is acquired, wherein the application program is being executed in association with at least one of the text input or the audio signal.

6. The intention analysis apparatus of claim 1, wherein the calculator is configured as having been trained by using, as training data, virtual conversational states obtained by classifying a plurality of pieces of training utterance data based on intentions overlapping between the plurality of pieces of training utterance data, and actual conversational states obtained by classifying the plurality of pieces of training utterance data based on a specific intention included in each of the plurality of pieces of training utterance data.

7. The intention analysis apparatus of claim 1, further comprising a memory and a processor that is configured to include one or more of the extractor, the verifier, and the calculator, and wherein the processor is further configured to train at least the calculator by using, as training data, virtual conversational states obtained by classifying a plurality of pieces of training utterance data based on intentions overlapping between the plurality of pieces of training utterance data, and actual conversational states obtained by classifying the plurality of pieces of training utterance data based on a specific intention included in each of the plurality of pieces of training utterance data, and to store parameters of the trained calculator in the memory, wherein the feature value and the at least one state value are input to the calculator to calculate the probability distribution of the user intention.

8. The intention analysis apparatus of claim 7, wherein the processor comprises a first determiner configured to determine the virtual conversational states based on the intentions overlapping between the plurality of pieces of training utterance data, and a second determiner configured to determine the actual conversational states associated with the plurality of pieces of training utterance data.

9. The intention analysis apparatus of claim 1, further comprising a processor that is configured to include one or more of the extractor, the verifier, and the calculator, and wherein the processor is further configured to perform the machine recognition of the audio signal.

10. The intention analysis apparatus of claim 1, wherein the verifier is further configured to verify, as the state value, history information of a plurality of commands executed by a user.

11. An intention analysis apparatus, the intention analysis apparatus comprising:
   a processor configured to:
   determine respective virtual conversational states based on intentions overlapping between a plurality of pieces of training utterance data; and
   determine respective actual conversational states associated with the plurality of pieces of training utterance data,
   wherein the processor is further configured to extract a feature value from an audio signal, verify a state value, and input the feature value and the state value to a trained intention model and calculate a probability distribution of a user intention for the audio signal as an output result of the trained intention model,
   wherein the intention analysis apparatus further comprises a verifier configured to verify the state value by considering an identifier of an application program and a state of the application program that is being executed in association with the audio signal, and
   wherein the state of the application program is a predetermined value corresponding to an instruction being executed by the application program.

12. The intention analysis apparatus of claim 11, wherein, to determine the respective virtual conversational states, the processor is configured to match each of the plurality of pieces of training utterance data to one of a plurality of predefined virtual conversational states based on at least one of an executed command or a corresponding domain associated with each of the plurality of pieces of training utterance data.

13. The intention analysis apparatus of claim 8, wherein the intention analysis apparatus is trained by machine learning that uses the plurality of pieces of utterance data as input data and that uses the virtual conversational state and the actual conversational state as output data.

14. The intention analysis apparatus of claim 11, wherein the processor is further configured to determine, as a sampling rate, a number of the plurality of pieces of training utterance data to use in the learning of the respective actual conversational states based on the respective virtual conversational states associated with the plurality of pieces of training utterance data.

15. An electronic device for providing a conversational agent to a user, the electronic device comprising:
   a sensor configured to, for an utterance of the user, acquire an audio signal corresponding to the utterance;
   a processor configured to extract a feature value associated with a text input corresponding to a machine recognition of the audio signal by applying a machine learning result to the text input, to verify at least one state value associated with an application program executed by the electronic device, and to calculate a probability distribution of a user intention corresponding to the utterance based on the feature value and the at least one state value; and
   a display configured to display an execution result of a task corresponding to the user intention to the user determined according to the calculated probability distribution,
   wherein the processor is further configured to verify the state value by considering a first identifier of an application program and a first state of the application program that is being executed by the electronic device in association with at least one of the text input or the audio signal, and
   wherein the first state of the application program is a predetermined value corresponding to an instruction being executed by the application program.

16. The electronic device of claim 15, wherein the processor is further configured to verify the state value by further considering at least one of a second identifier of the electronic device or a second state of the electronic device that executes an application program associated with at least one of the text input or the audio signal.

17. The electronic device of claim 15, wherein the processor is further configured to verify the state value defined based on a first command that is a last command executed by the application program before the audio signal is acquired, wherein the application program is being executed in association with at least one of the text input or the audio signal.

* * * * *